Jan. 15, 1946.   G. E. DATH   2,392,977
FRICTION SHOCK ABSORBER
Filed March 13, 1944
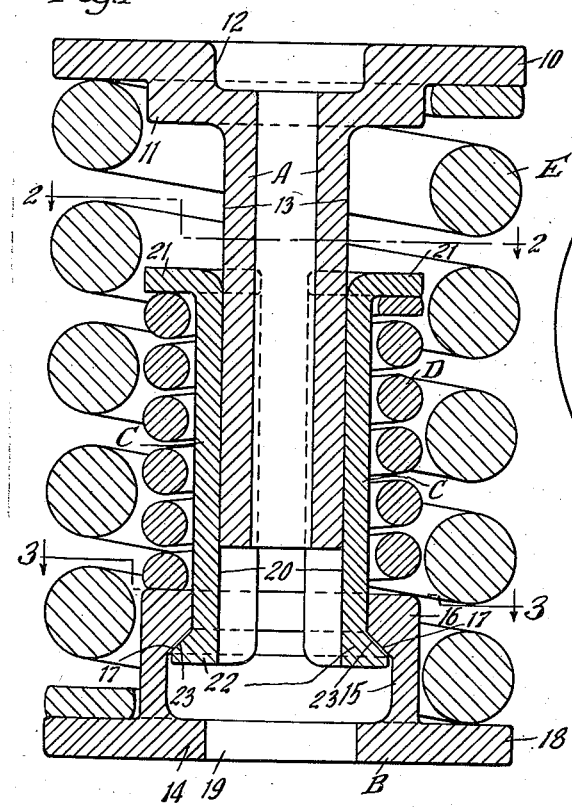
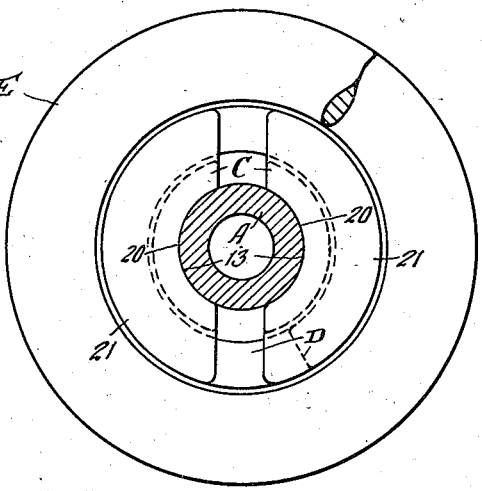
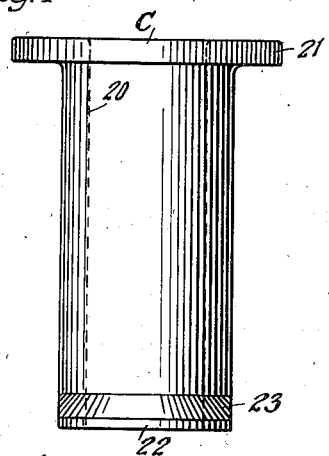
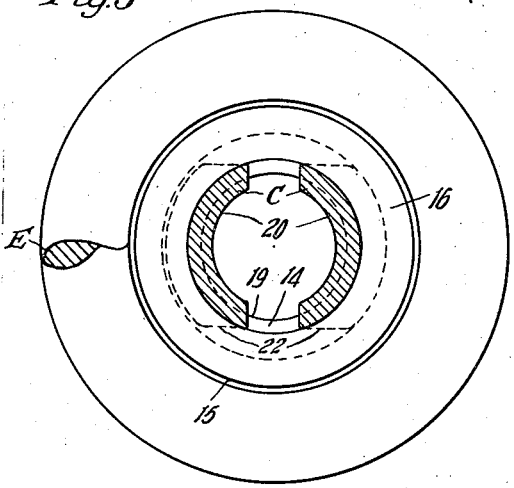
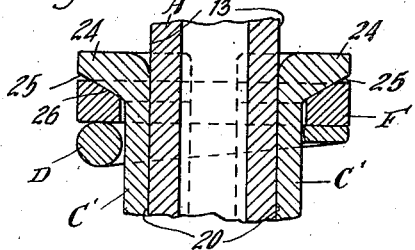
Inventor
George E. Dath
By Henry Fuchs
Atty.

Patented Jan. 15, 1946

2,392,977

UNITED STATES PATENT OFFICE 2,392,977

FRICTION SHOCK ABSORBER

George E. Dath, Chicago, Ill., assignor to W. H. Miner, Inc., Chicago, Ill., a corporation of Delaware Application March 13, 1944, Serial No. 526,204

6 Claims. (Cl. 267—9)

This invention relates to improvements in friction shock absorbers, especially adapted for use with truck springs of railway cars for snubbing or dampening the action of the springs.

One object of the invention is to provide a shock absorber comprising a friction post, a plurality of friction shoes having lengthwise sliding engagement with the friction surfaces of the post, an end follower having wedging engagement with the shoes, a spring reacting between said end follower and shoes to wedge the shoes against the post into tight frictional contact with the friction surfaces thereof, and a spring yieldingly opposing relative lengthwise movement of the post and shoes.

A further object of the invention is to provide a friction shock absorber as set forth in the preceding paragraph, wherein the spring which reacts between the shoes and end follower is under constant predetermined compression, whereby the frictional resistance between the post and shoes is maintained substantially constant during both compression and release of the mechanism.

Other objects of the invention will more clearly appear from the description and claims hereinafter following.

In the drawing forming a part of this specification, Figure 1 is a transverse vertical sectional view of my improved shock absorber. Figures 2 and 3 are horizontal sectional views, corresponding respectively to the lines 2—2 and 3—3 of Figure 1. Figure 4 is an elevational view of one of the shoes of the improved shock absorber, the shoe illustrated being that at the left hand side of Figure 1, looking from left to right. Figure 5 is a transverse vertical sectional view of the upper end portion of the shoes and associated parts of another embodiment of the invention.

Referring first to the embodiment of the invention illustrated in Figures 1 to 4 inclusive, my improved shock absorber comprises broadly a friction post A; an end follower B; two friction shoes C—C; an inner spring D; and an outer spring E.

The friction post A comprises a tubular member of cylindrical transverse cross section, forming the post proper, and a disclike follower 10 at the upper end of the tubular member, which is formed integral therewith. The follower 10 has a central, downwardly projecting, hollow, cylindrical boss 11 thereon from which the tubular member depends. The interior of the hollow boss 11 provides an upwardly opening seat 12 adapted to accommodate the usual spring centering projection of the spring follower plate of the cluster of truck springs of a railway car. The cylindrical outer surface of the tubular member presents a longitudinally extending friction surface 13 which is slidably engaged by the friction shoes C—C.

The end follower B comprises a substantially flat, disclike plate 14 and a cylindrical, upstanding, shell-like portion, or annular wedge member 15, formed integral therewith. The cylindrical wall of the shell-like wedge member is inwardly thickened at its open upper end, said thickened portion, which is indicated by 16, being in the form of an annulus and having a downwardly facing, annular, inner wedge face 17. The shell-like portion, or wedge member 15, is of substantially the same external diameter as the boss 11 of the upper follower 10. The disclike follower plate 14 thus presents an annular flangelike portion 18, which serves as an abutment for the bottom end of the outer spring E. A central opening 19 is provided in the disclike follower plate, forming a seat adapted to accommodate the usual spring centering projection of the lower spring follower plate of the cluster of truck springs of a railway car.

The two friction shoes C—C are of the same design, each shoe comprising a transversely curved, plate-like section, having a longitudinally extending, transversely curved, inner friction surface 20, fitting the cylindrical friction surface 13 of the post A. At the upper end, each shoe C has a horizontally disposed, laterally outwardly projecting, arc-shaped, spring abutment flange 21. At the lower end, each shoe is laterally outwardly thickened, thereby presenting a laterally outwardly projecting, arc-shaped enlargement 22. The enlargement is provided with an upwardly facing wedge face 23, correspondingly inclined to and engaging the wedge face 17 of the wedge member 15.

The friction shoes C—C embrace opposite sides of the post A and have their friction surfaces 20—20 slidingly engaged with the friction surface 13 of the latter.

The inner spring D comprises a light coil surrounding the shoes C—C and having its top and bottom ends bearing respectively on the flanges 21—21 of the shoes and the upper end of the shell-like wedge member 15. The spring D is under predetermined compression in the assembled condition of the mechanism and the tendency of the same to expand presses the shoes C—C upwardly with respect to the wedge member 15, forcing the wedge faces 23—23 of the shoes against the wedge face 17 of the wedge member 15. Due to this wedging action, the shoes are held tightly against the friction surface of the post. The spring D being under initial predetermined compression may expand as wear of the parts of the mechanism occurs, thus compensating for such wear.

The outer spring E comprises a heavy coil surrounding the post and friction shoes, having its top and bottom ends bearing respectively on the disclike follower 10 of the post A and the flange 18 of the end follower B. The spring E is under initial compression and yieldingly opposes relative movement of the post A and end follower B and the shoes C—C carried by the follower B lengthwise of the mechanism.

Referring next to Figure 5, which illustrates another embodiment of the invention, the friction shoes, which are indicated by C'—C', are shown as provided with wedge faces at their upper ends, and a wedge ring bearing on the upper end of the inner spring cooperates with these wedge faces of the shoes.

In Figure 5 the friction post, which is the same as that illustrated in Figures 1 to 4 inclusive, is indicated by A.

The friction shoes, which are indicated by C'—C' in Figure 5, are identical with the shoes C—C hereinbefore described, with the exception that they are provided with laterally outwardly thickened portions at their upper ends, forming wedge projections 24—24, which have inwardly directed wedge faces 25—25 thereon.

The inner spring shown in Figure 5, which is the same as the inner spring D hereinbefore described, is also indicated by D in Figure 5.

A wedge ring F cooperates with the wedge faces 25—25 of the shoes C'—C' for wedging the upper ends of the shoes against the post. The ring F surrounds the shoes C'—C' and is interposed between the upper end of the spring D and the wedge projections 24—24 of the shoes. At its upper side, the wedge ring F has an annular wedge face 26 engaging the wedge faces 25—25 at the upper ends of the shoes C'—C'.

My improved shock absorber is substituted for one or more of the coil spring units of a cluster of truck springs, the same being interposed between the top and bottom spring follower plates of said cluster.

The operation of the improved shock absorber shown in Figures 1 to 4 inclusive is as follows: Upon the spring cluster of the truck of the railway car being compressed between the spring follower plates of the cluster, the post A is moved downwardly with respect to the shoes and the spring E compressed between the follower 10 of the post and the end follower B. During this action the post slides on the friction surface of the shoes, setting up the required frictional resistance to snub the action of the coils of the truck spring cluster.

During recoil of the truck springs, expansion of the spring E returns all of the parts to the normal position shown in Figure 1, the post sliding upwardly with respect to the shoes. Inasmuch as the inner spring D is under predetermined constant compression, the shoes are at all times pressed against the friction surface of the post, thereby providing the same amount of snubbing action during recoil of the truck springs as is had during compression of the same.

The operation of the improved shock absorber, as modified in Figure 5, is identical with that of the device shown in Figures 1 to 4 inclusive. As will be evident, the provision of wedge faces at opposite ends of the shoes, as indicated in Figure 5, tends towards equalization of the pressure lengthwise of the cooperating friction surfaces of the shoes and post.

I claim:

1. In a friction shock absorber, the combination with a friction post having a follower at the outer end thereof; of an end follower, said end follower and post being movable toward and away from each other in a direction lengthwise of the mechanism; a wedge sleeve having an interior wedge face, said sleeve being rigid with said end follower; friction shoes embracing said post and having lengthwise sliding engagement therewith, said shoes having wedging engagement with the wedge face of said wedge sleeve; a spring reacting between said wedge sleeve and shoes for wedging the shoes against the wedge face of said sleeve; and spring means interposed between said follower of the post and the end follower and yieldingly opposing relative lengthwise movement of the post and shoes toward each other.

2. In a friction shock absorber, the combination with a friction post having a follower at the outer end thereof; of an end follower, said end follower and post being movable toward and away from each other in a direction lengthwise of the mechanism; a wedge member rigid with said end follower, said wedge member having an interior, annular wedge face; friction shoes embracing said post and having lengthwise sliding engagement therewith, said shoes having wedge faces engaging the wedge face of said wedge member; a spring reacting between said wedge member and shoes for wedging the shoes against the wedge face of said sleeve; and spring means interposed between said follower of the post and the end follower and yieldingly opposing relative lengthwise movement of the post and shoes toward each other.

3. In a friction shock absorber, the combination with a cylindrical friction post having a follower at the outer end thereof; of an end follower, said end follower and post being movable toward and away from each other in a direction lengthwise of the mechanism; a cylindrical wedge sleeve having an interior, annular wedge face, said sleeve being rigid with said end follower; friction shoes embracing said post and having lengthwise sliding engagement with said post, said shoes extending at their lower ends into said wedge sleeve and having wedge faces at their lower ends in wedging engagement with said annular wedge face; a spring reacting between said wedge sleeve and shoes for wedging the shoes against the wedge face of said sleeve; and spring means interposed between said follower of the post and the end follower and yieldingly opposing relative lengthwise movement of the post and shoes toward each other.

4. In a friction shock absorber, the combination with a friction post having a follower at the outer end thereof; of an end follower, said end follower and post being movable toward and away from each other in a direction lengthwise of the mechanism; a wedge sleeve integral with said end follower and having an interior, laterally inwardly extending wedge projection provided with an inner wedge face; friction shoes embracing said post at opposite sides, said shoes and post being lengthwise slidable with respect to each other, each shoe having a flange at the inner end thereof and a wedge projection at the outer end, the inner ends of said shoes extending into the wedge sleeve with said wedge projections of said shoes engaged with the wedge projection of said sleeve; an inner spring surrounding said shoes and bearing at opposite ends on the inner end of the sleeve and the flanges of the shoes; and an outer spring surrounding said shoes and post and bearing at opposite ends on the follower of the post and the end follower.

5. In a friction shock absorber, the combination with a friction post having a follower at the outer end thereof; of an end follower, said end follower and post being movable toward and away from each other in a direction lengthwise of the mechanism; a wedge sleeve integral with said end follower and having an interior, laterally inwardly extending wedge projection provided with an inner wedge face; friction shoes embracing said post at opposite sides, said shoes and post being lengthwise slidable with respect to each other, each shoe having outer wedge faces at the inner and outer ends thereof; a wedge ring surrounding the inner ends of the shoes and having a wedge face engaging said inner end wedge faces, said outer end wedge faces of the shoes engaging the wedge projection of said sleeve; an inner spring under predetermined constant compression surrounding said shoes and bearing at opposite ends on the inner end of the sleeve and the wedge ring; and an outer spring surrounding said shoes and post and bearing at opposite ends on the follower of the post and the end follower.

6. In a friction shock absorber, the combination with a friction post having a follower at the outer end thereof; of an end follower, said end follower and post being movable toward and away from each other in a direction lengthwise of the mechanism; a wedge sleeve integral with said end follower and having an interior, laterally inwardly extending wedge projection provided with an inner wedge face; friction shoes embracing said post at opposite sides, said shoes and post being lengthwise slidable with respect to each other, each shoe having a flange at the inner end thereof and a wedge projection at the outer end, the inner ends of said shoes extending into the wedge sleeve with said wedge projections of said shoes engaged with the wedge projection of said sleeve; an inner spring under predetermined constant compression surrounding said shoes and bearing at opposite ends on the inner end of the sleeve and the flanges of the shoes; and an outer spring surrounding said shoes and post and bearing at opposite ends on the follower of the post and the end follower.

GEORGE E. DATH.